US007752089B2

(12) United States Patent
Sarangapani et al.

(10) Patent No.: US 7,752,089 B2
(45) Date of Patent: Jul. 6, 2010

(54) ADAPTIVE INVENTORY MANAGEMENT SYSTEM

(75) Inventors: Jagannathan Sarangapani, Rolla, MO (US); Anil Ramachandran, Rolla, MO (US); Can Saygin, San Antonio, TX (US); Kainan Cha, Olathe, MO (US)

(73) Assignee: The Curators of the University of Missouri, Columbia, MO (US)

( * ) Notice: Subject to any disclaimer, the term of this patent is extended or adjusted under 35 U.S.C. 154(b) by 37 days.

(21) Appl. No.: 12/037,799

(22) Filed: Feb. 26, 2008

(65) Prior Publication Data

US 2009/0012882 A1 Jan. 8, 2009

Related U.S. Application Data

(60) Provisional application No. 60/892,711, filed on Mar. 2, 2007.

(51) Int. Cl.
*G06Q 10/00* (2006.01)
(52) U.S. Cl. .................. 705/28; 701/300; 701/210; 235/385
(58) Field of Classification Search .......... 705/28, 705/22; 235/385; 340/572.1, 10
See application file for complete search history.

(56) References Cited

U.S. PATENT DOCUMENTS

| 5,525,992 | A | 6/1996 | Froschermeier | |
|---|---|---|---|---|
| 6,148,291 | A * | 11/2000 | Radican | 705/28 |
| 6,483,427 | B1 | 11/2002 | Werb | |
| 6,600,418 | B2 * | 7/2003 | Francis et al. | 340/572.1 |
| 6,639,509 | B1 | 10/2003 | Martinez | |
| 2003/0174099 | A1 | 9/2003 | Bauer et al. | |
| 2004/0192247 | A1 | 9/2004 | Rotta et al. | |
| 2005/0080680 | A1 | 4/2005 | Elam et al. | |
| 2005/0083181 | A1 | 4/2005 | Jalkanen et al. | |
| 2005/0084003 | A1 | 4/2005 | Duron et al. | |
| 2005/0093679 | A1 | 5/2005 | Zai et al. | |
| 2005/0280508 | A1 | 12/2005 | Mravca et al. | |
| 2006/0006986 | A1 | 1/2006 | Gravelle et al. | |
| 2006/0012465 | A1 | 1/2006 | Lee et al. | |

(Continued)

FOREIGN PATENT DOCUMENTS

WO      01/65481  A1    9/2001

(Continued)

OTHER PUBLICATIONS

Dobkin et al., "A Radio-Oriented Introduction to RFID—Protocols, Tags and Applications," High Frequency Electronics, RFID Tutorial, Aug. 2005, pp. 32-46.

(Continued)

*Primary Examiner*—Vanel Frenel
(74) *Attorney, Agent, or Firm*—Polsinelli Shughart PC

(57) ABSTRACT

An adaptive inventory management system and method eliminates or minimizes frequency interference issues within a facility that employs a plurality of RFID readers for purposes of tracking and managing inventory. A middleware server activates and deactivates adjacent RFID readers within the facility based on the location of an item having an RFID tag. The middleware server also queries an inventory database based on the information collected from the RFID tag of the item and generates a command signal based on information retrieved from the database to control the travel route of the vehicle transporting items of inventory within the facility.

23 Claims, 19 Drawing Sheets

U.S. PATENT DOCUMENTS

| | | |
|---|---|---|
| 2006/0022800 A1 | 2/2006 | Krishna et al. |
| 2006/0022815 A1 | 2/2006 | Fischer et al. |
| 2006/0049249 A1 | 3/2006 | Sullivan |
| 2006/0049946 A1 | 3/2006 | Sullivan et al. |
| 2006/0054708 A1 | 3/2006 | Koo et al. |
| 2006/0103535 A1 | 5/2006 | Pahlaven et al. |
| 2006/0176152 A1 | 8/2006 | Wagner et al. |
| 2006/0186999 A1 | 8/2006 | McLaughlin |
| 2006/0197652 A1 | 9/2006 | Hild et al. |
| 2006/0197653 A1 | 9/2006 | Kung et al. |
| 2006/0202800 A1 | 9/2006 | Ohashi et al. |

FOREIGN PATENT DOCUMENTS

| | | |
|---|---|---|
| WO | 2005/085899 A1 | 9/2005 |

OTHER PUBLICATIONS

Dobkin et al., "The RF in RFID: A Radio-oriented Introduction to Radio Frequency Identification," Enigmatics, Jun. 7, 2005, Part II, v. 0.1, pp. 1-20.

IBM Corporation, "Using RFID technology to enhance output solutions," IMB Printing Systems, Mar. 2006, pp. 1-14 (16 pages).

Unknown, "Medium Access Mechanism to Prevent RFID Reader Collision," Inside Edge, submitted Sep. 10, 2005, pp. 1-21.

Intelleflex Corporation, Passive, Battery-assisted Passive and Active Tags: A Technical Comparison, 2005, pp. 1-6.

* cited by examiner

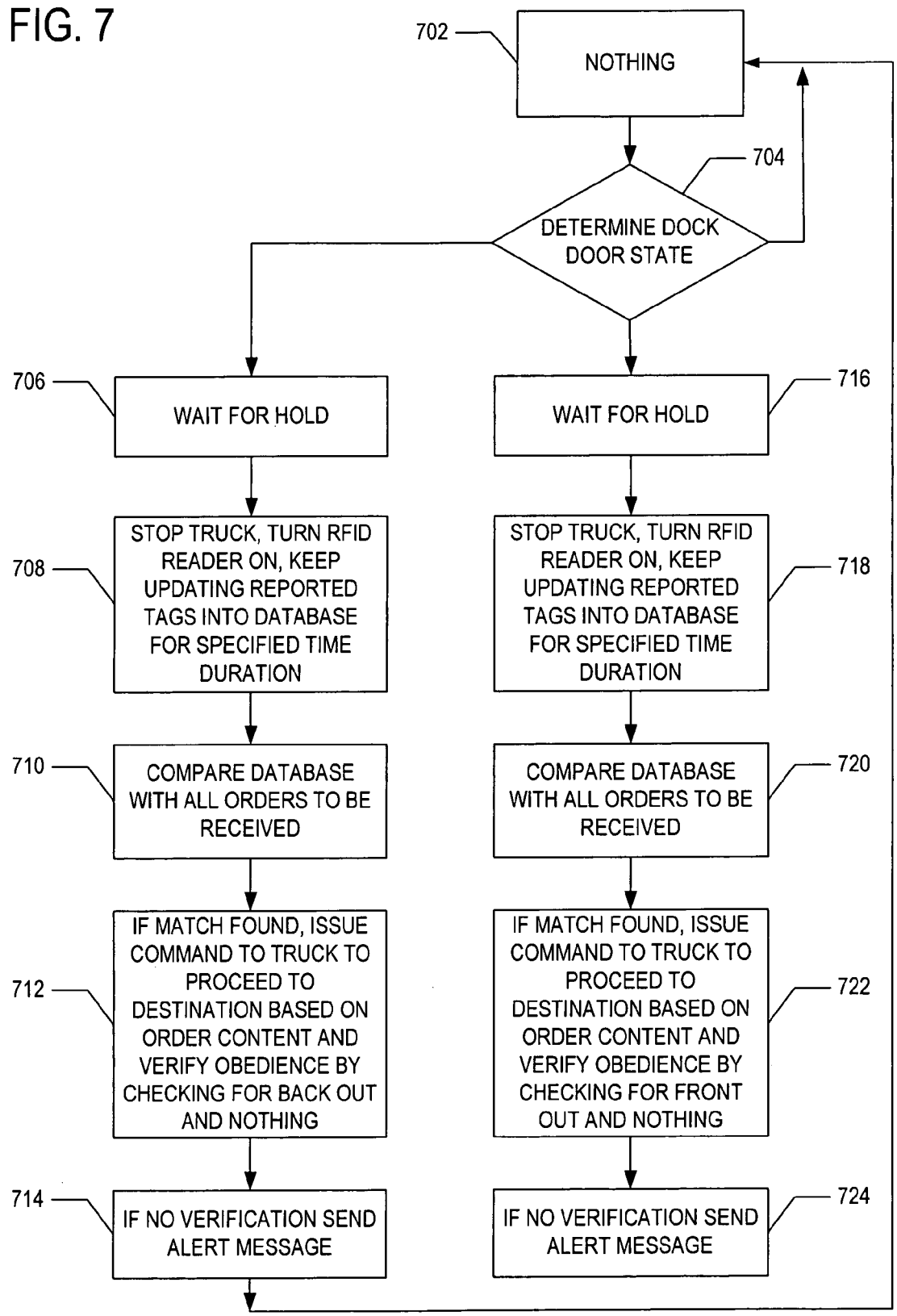

ADAPTIVE INVENTORY MANAGEMENT SYSTEM

CROSS-REFERENCE TO RELATED APPLICATION

This patent application claims priority from U.S. provisional patent application Ser. No. 60/892,711 filed on Mar. 2, 2007 and is herein incorporated by reference in its entirety.

STATEMENT REGARDING FEDERALLY SPONSORED RESEARCH

This invention was made with Government support under Grant No. FA8650-04-C-704 awarded by the Air Force Research Laboratory. The Government has certain rights in the invention.

FIELD

The present document relates to a radio frequency identification inventory management system, and more particularly to an adaptive radio frequency identification inventory management system.

BACKGROUND

Radio frequency identification (RFID) technology has experienced increased application in the manufacturing process and industry in recent years. From supply chain logistics to enhanced shop floor control, this technology presents opportunities for process improvement or re-engineering. The underlying principle of RFID technology is to obtain information from an RFID tag ("tag") by using a RFID reader ("reader") through radio frequency (RF) communication. The tag can be incorporated into or attached to a product, material, equipment, or person. In passive RFID systems, the tag does not include an internal power source and is activated by harvesting energy from a carrier signal received from the reader. Once activated, the tag responds to the reader through backscatter communication. This backscatter communication may include information that identifies the passive tag, and/or information about the item associated with the tag.

A network of distributed readers can be used to monitor the flow of tags and provide visibility in a manufacturing environment. For example, each RFID reader may be operatively associated with a central computer that may track and determine the location of one or more tagged products or materials based on the particular RFID reader that detected the passive tag's backscatter communication. Because readers have a maximum effective distance, or read range, at which they can communicate with a tag, it may be necessary to form a dense reader network by arranging readers relatively close to one another to obtain a desired read range within a particular process flow.

However, when multiple readers are deployed in such a dense reader network, a carrier signal from one reader may reach another reader in the same channel at a certain distance and interfere with that reader's ability to read any tags that fall within a certain range. This RFID interference problem is referred to as Reader Collision, and can be classified as either frequency interferences or tag interference. Frequency interference occurs when readers operating in the same frequency channel introduce high noise levels at each other, thereby interfering or jamming the on-going communication with tags. Tag interference occurs when multiple readers are attempting to read a tag at the same time regardless of the differences in frequency. Consequently, Reader Collision causes tags to be unreadable and disturbs the normal operation of the readers by lowering the overall read rates.

SUMMARY

In one embodiment an adaptive inventory management system may include a first sensor located at a first point along a route of travel of a vehicle for determining a position of the vehicle relative to the first point with the vehicle transporting one or more items of inventory. A second sensor located at a second point along the route of travel of the vehicle for determining the position of the vehicle relative to the second point. A plurality of readers with each of the plurality of readers being positioned at predetermined locations along the route of travel, and wherein each of the one or more items of inventory include at least one tag in operative communication with the one or more of the plurality of readers such that the at least one tag is detected by at least one of the plurality of readers for retrieving inventory data from the at least one tag. A server in operative association with the first and second sensors and in operative association with the plurality of readers for activating and deactivating one or more of the plurality of readers as a function of the determined position of the vehicle relative to the first and second points.

In another embodiment a method of adaptive inventory management may include: generating a first position signal at a first sensor located at a first point along a route of travel of a vehicle, wherein the first position signal indicates a position of the vehicle relative to the first point, and wherein the vehicle transports one or more items of inventory; generating a second position signal at a second sensor located at a second point along the route of travel of the vehicle, wherein the second position signal indicates a position of the vehicle relative to the second point; determining a position of the vehicle along the route of travel as a function of the first and second position signals; and controlling the operation of each of a plurality of readers positioned at predetermined locations along the route of travel as a function of the determined position of the vehicle.

In yet another embodiment the adaptive inventory management system may include a first sensor located at a first point along a route of travel of a vehicle for generating a first position signal with the first position signal indicating a position of the vehicle relative to the first point, and the vehicle transporting one or more items of inventory. A second sensor may be located at a second point along the route of travel of the vehicle for generating a second position signal with the second position signal indicating a position of the vehicle relative to the second point. A plurality of readers with each of the plurality of readers being positioned at predetermined locations along the route of travel, and wherein each of the one or more items of inventory include at least one tag in operative communication with the one or more of the plurality of readers such that the at least one tag communicates with at least one of the plurality of readers to identify inventory information from the at least one tag. A processor including a decision component to control the operation of the each of the plurality of readers and a sensor front-end component to provide a communication interface between the decision component and the first and second sensors, wherein the decision component is responsive to the first position signal and the second position signal to determine a position of the vehicle; and wherein the decision component controls the operation of each of the plurality of readers as a function of the determined position of the vehicle.

Additional objectives, advantages and novel features will be set forth in the description which follows or will become apparent to those skilled in the art upon examination of the drawings and detailed description which follows.

BRIEF DESCRIPTION OF THE DRAWINGS

FIG. 7 is a flow chart illustrating a method for determining a state of the dock door and managing items of inventory.

Corresponding reference characters indicate corresponding elements among the several views. The headings used in the figures should not be interpreted to limit the scope of the figures.

DETAILED DESCRIPTION

Figure 1:
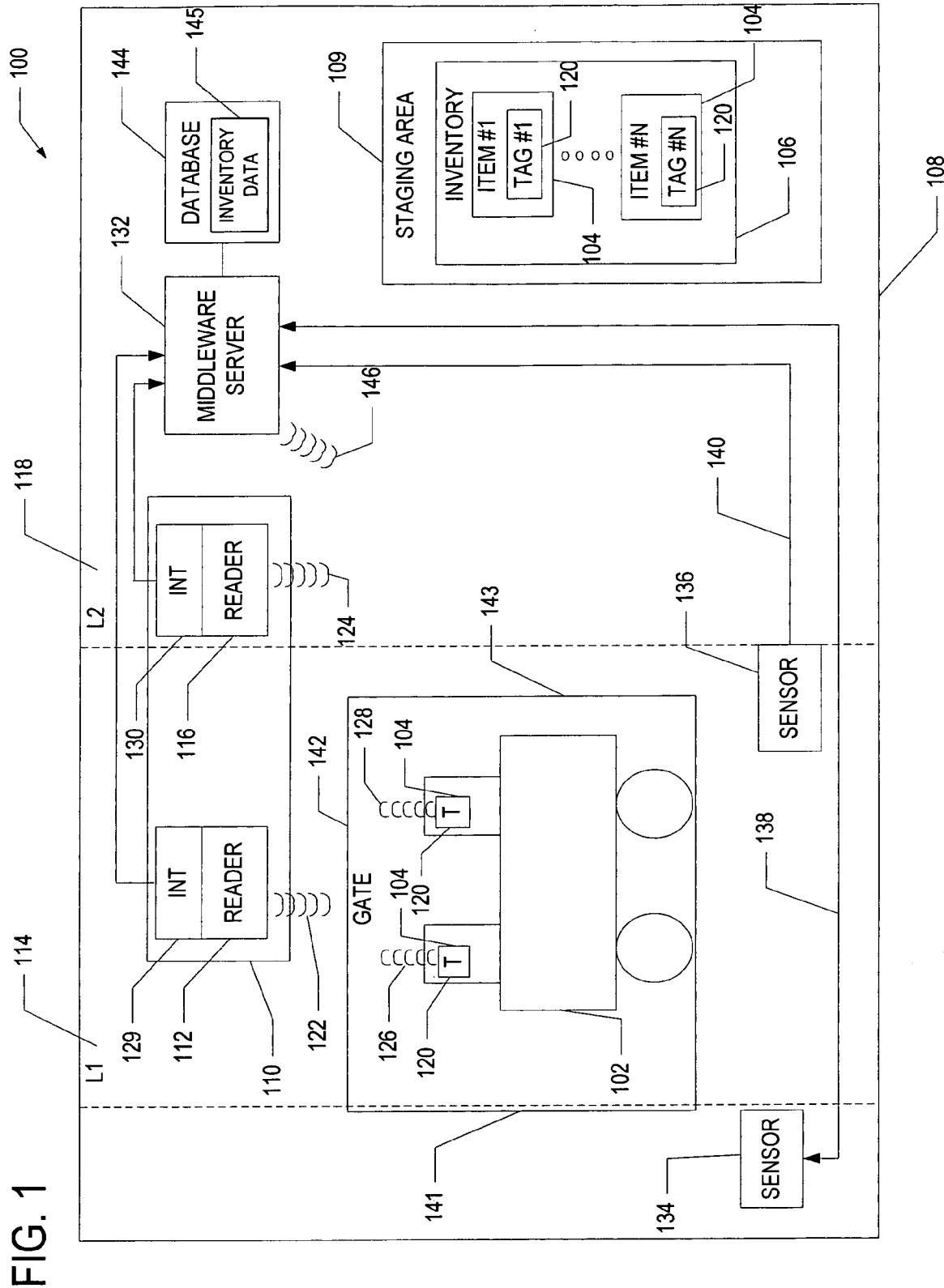
FIG. 1 is a simplified block diagram illustrating a working environment in which embodiments of an inventory management system may be implemented.

Referring to the drawings, a system and method for implementing an adaptive inventory management system is generally indicated as 100 in FIG. 1. As shown in FIG. 1, a simplified block diagram illustrates a vehicle 102 transporting one or more items 104 of inventory 106 through a facility 108. The facility 108 can be a manufacturing facility, a storage facility, or any other facility in which vehicles or any other type of mobile transportation can be used to transport items 104 to and from a staging area 109 where a plurality of items 104 (e.g., items 1-N) are stored as inventory 106.

The facility 108 may include a network of RFID readers 110 that are strategically positioned at different locations throughout the facility 108 to track the location of items 104 being transported through the facility 108. For example, a first reader 112 is located at a first location, L1, in the facility 108, as indicated by reference character 114, and a second reader 116 is located at a second location, L2, in the facility 108, as indicated by reference character 118.

A RFID tag 120 can be physically affixed to or incorporated into each of the one or more items 104 of inventory 106 being transported through the facility 108. For example, the tag 120 may be affixed to items in retail inventory, warehouse inventory, manufacturing inventory, or any other type of inventory 106. The first and second readers 112, 116 may transmit first and second carrier signals 122, 124, respectively, which can be received by the tag 120 of an item 104 located within the transmission range of one or both of the first and second readers 112, 116.

The tag 120 may be a data-carrying device that does not include an internal voltage source, and is totally passive when it is not within the transmission range of a reader. In other words, the tag 120 is only activated when it is within the transmission or read range of the first reader 112 or the second reader 116. The power required to activate the tag 120 is harvested from a received carrier signal. For example, the first and second carrier signals 122, 124 may be low-voltage oscillating RF energy signals that have an initial power level $P_1$. The tag 120 includes an energy harvesting circuit (not shown) that uses the low-voltage oscillating RF energy carrier signal to generate a voltage to power internal communication circuitry of the tag 120. When the tag 120 is within the transmission range of the first reader 112 such that tag 120 receives the carrier signal 122, the tag 120 transmits data via a backscatter signal 126 having a power level $P_2$, back to the first reader 112.

Alternatively, when the tag 120 is within the transmission range of the second reader 116 such that it receives the carrier signal 124, the tag 120 transmits data via the backscatter signal 128 having a power level $P_2$, back to the second reader 116. The transmitted data contained on the backscatter signal 128 may identify the tag 120, and/or information about the item 104 associated with the tag 120. As used herein, the transmission of carrier and backscatter signals between a reader and tag is known as interrogation. The first and second readers 112, 116 can each be configured with communication interfaces 129, 130, respectively, that enable wired or wireless communication with a RFID middleware server ("middleware server") 132. As a result, the middleware server 132 can communicate with each of the first and second readers 112, 116 for the purpose of tracking the location of items 104 being transported through the facility 108. In addition, the middleware server 132 may be responsive to the type of items 104 being carried on the vehicle 102 to generate commands that can be used to control the direction the vehicle 102 may travel within the facility 108.

In order to achieve a desired coverage area, it may be necessary to place readers relatively close to one another. As described above, when multiple readers are deployed in a working environment such as illustrated in FIG. 1, the carrier signal 124 from the second reader 116 may reach the first reader 112, thereby jamming or otherwise interfering with ongoing communications between the first reader 112 and tag 120. Alternatively, the carrier signal 122 from the first reader 112 may reach the second reader 116, thereby also jamming or otherwise interfering with ongoing communication between the second reader 116 and tag 120. This occurs because the tag 120, first reader 112, and second reader 116 transmit in the same frequency band, and is referred to as frequency interference. Advantageously, the middleware server 132 can activate and deactivate adjacent RFID readers based on the position of the vehicle 102 transporting the items 104 through the facility 108 such that frequency interference between adjacent RFID readers is avoided.

For example, according to an aspect of the adaptive inventory management system 100, a first sensor 134 (e.g., front sensor) and second sensor 136 (e.g., back sensor) generate output signals 138, 140, respectively, based on a detected position of the vehicle 102 relative to a gate 142 or access point of the facility 108. In this illustration, a first side (e.g., front) 141 of the gate 142 leads to the outside of the facility 108 and a second side 143 (e.g., back) of the gate 142 leads to the inside of the facility 108 (e.g., shop floor). As will be explained in greater detail below, in this particular aspect of the inventory management system 100, the position of the vehicle 102 relative to the gate 142 can be described as front in, front out, back in, or back out. The middleware server 132 can be communicatively connected to the sensors 134, 136 to receive the output signal 138, 140. The middleware server 132 is responsive to the received output signals 138, 140 to control the operation of the first and second readers 112, 116 such that frequency interference can be avoided. For example, based on the detected position of the vehicle 102, the middleware server 132 may activate (i.e., turn-on) the first reader 112 to collect information from the tags 120 of items 104 being transported on the vehicle 102 and may deactivate (i.e., turn-off) the second RFID reader 116 which otherwise could potentially interfere with the first reader's 112 interrogation of the tag 120.

Thereafter, the first RFID reader 112 provides information collected from the tags 120 back to the middleware server 132. The middleware server 132 queries a database 144 storing inventory data 145 to identify inventory data 145 that matches the collected item information. Thereafter, the middleware 132 generates a command signal, as indicated by reference character 146, based on the query results and transmits the generated command signal 146 to the vehicle 102. For example, based on the collected item information, the command signal 146 may include route instructions that define a particular travel route for the vehicle 102 within the facility 108. As a result, the inventory management system 100 may eliminate or minimize frequency interference issues in a facility 108 having a dense network of readers 109 while still maintaining effective inventory management. The purpose of the middleware sever 132 is not only to gather information from the RFID readers but also from other communication devices such as infrared sensors. Additionally, the middleware server 132 may be utilized to multiplex the various communications devices and maintain a reliable wireless communication medium in this multi-sensor environment, which is prone to RF interferences and tag collisions.

Figure 2:
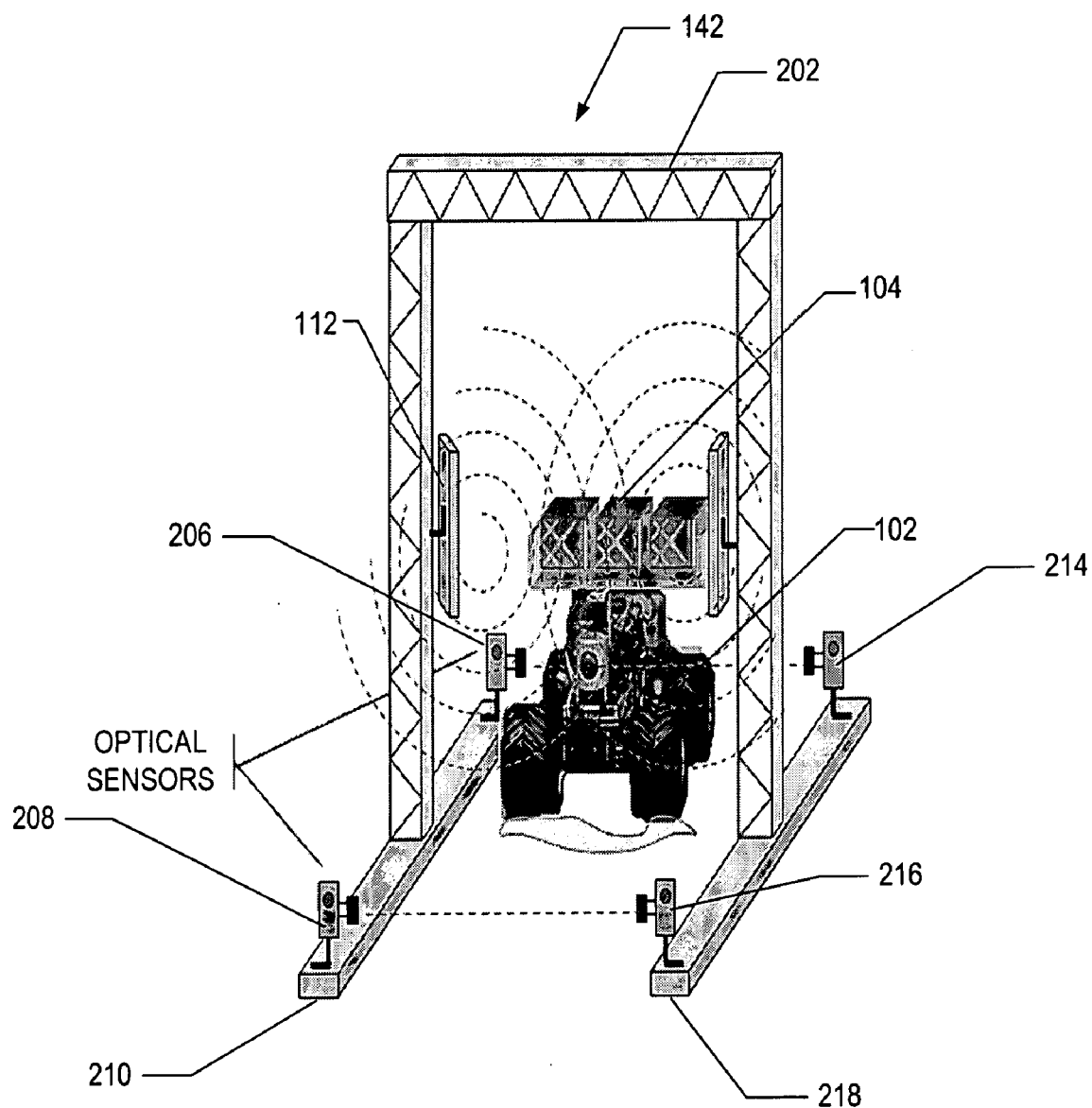
FIG. 2 is a perspective view of a dock door and vehicle shown in the working environment.

Referring now to FIG. 2, a perspective view of the gate 142 and vehicle 102 is illustrated. In this illustration, the gate 142 may be a dock door 202 and the vehicle 102 can be an automated guided vehicle (AGV), which has a mobile base that includes a microcontroller board (not show) and 900 Mhz Maxstream radio communication device (not shown). As further shown, two infrared sensors 206, 208 are mounted to a leg 210 of the dock door 202, while two infrared light sources 214, 216 are mounted to an opposite leg 218 of the dock door 202. The infrared sensors 206, 208 detect light being emitted from the infrared light sources 214, 216, respectively, and generate output signals (i.e., output signals 138, 140, respectively) that indicate the location of the vehicle 102 relative to the dock door 202. More specifically, the magnitude of the generated output signals 138, 140 can be used to determine whether a vehicle 102 is present at the dock door 202 and/or the state of the dock door 202. For example, when sensors 206, 208 detect infrared light emitted from the corresponding light sources 214, 216, the generated output signals 138, 140 may each be a high voltage signal (i.e., 5 volts). On the other hand, when sensors 206, 208 are unable to detect infrared light emitted from the corresponding infrared light sources 214, 216 due to, for example, the light being obstructed by the vehicle 102, the generated output signals may each be a low voltage signal (i.e., 0 volts). Although the magnitude of the output signals 138, 140 of sensors 206, 208 are described herein as being normally high, it is contemplated that in other aspects of the adaptive inventory management system the magnitude of the output signals 138, 140 of sensors 206, 208 can be normally low. In addition although the magnitude of the generated output signals 138, 140 are described as being measured in terms of voltage, it is contemplated that the magnitude of generated output signals 138, 140 may also be measured in terms of frequency.

The sensors 206, 208 may be communicatively coupled to the middleware server 132 such that the middleware server 132 can receive the generated output signals 138, 220. The middleware server 132 is responsive to the received output signal 138, 140 to determine the state of the dock door 202 as function of the magnitude of the received output signals 138, 140. At any given point in time, the dock door 202 can be in any one of at least six possible states: FRNT IN, FRNT OUT, BACK IN, BACK OUT, NOTHING and HOLD.

Figure 3A:
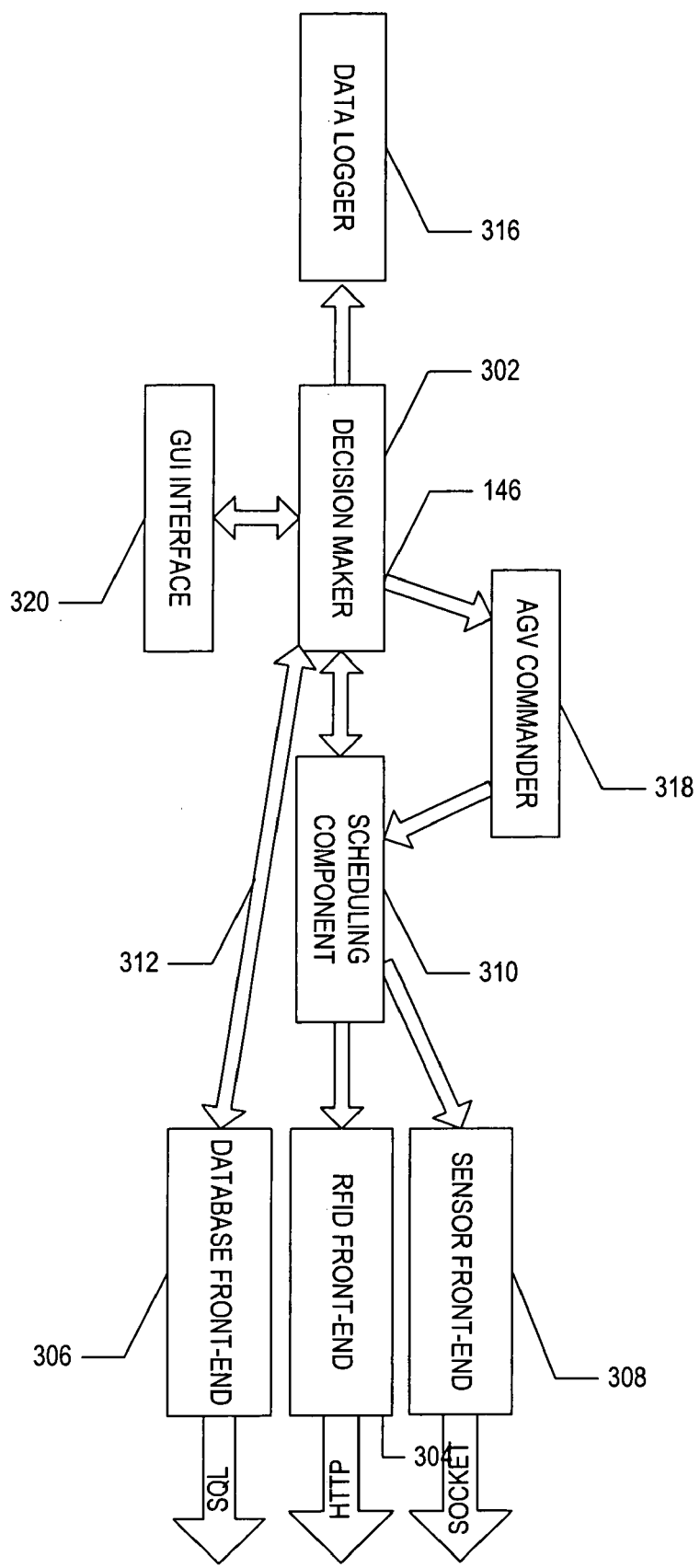
FIG. 3A is simplified block diagram illustrating operational components of a middleware server according to an aspect of the inventory management system.

Referring to FIG. 3A, a simplified block diagram illustrates the components of a middleware server 132 according to an aspect of the inventory management system 100. The middleware server 132 may include decision component 302 communicatively coupled to a RFID front-end component 304, a database front-end component 306, a sensor front-end component 308, and a scheduling component 310 and can issue commands to control the operation of the vehicle 102 for inventory balancing purposes as well as issue commands to control the operation of the network of RFID readers 110 within the facility 108.

The RFID reader front-end component 304 may be operatively coupled to the decision component 302 and provide an interface between the decision component 302 and each individual RFID reader from the network of RFID readers 110 within the facility 108. The RFID reader front-end component 304 may include software, hardware, networking, and communication protocols required for communicating RFID information to the decision component 302 in a suitable format for decision-making. As described above in connection with FIG. 1, when the tag 120 of an item being carried on a vehicle is within the reading range of a particular reader, that particular reader can interrogate the tag 120 to receive information about the item. According to one aspect of the inventory management system 100, the decision component 302 is responsive to tag information received from a RFID reader (e.g., readers 112, 116) to issue a query request, as indicated by 312, to the database front-end component 306.

The database front-end component 306 may be operatively coupled to an inventory database (e.g., database 144) that stores inventory data and/or vehicle data and is responsive to the query request 312 from the decision component 302 to query the database 144 to identify and retrieve inventory data that corresponds to the received tag information. For example, the query results may include the location of an inventory staging area 109 for the type of item identified by the tag information. The decision component 302 can use the retrieved inventory staging area information to generate a command 146 to direct the vehicle 102 carrying the item 104 to that particular location within the facility 108.

The sensor front-end component 308 may be operatively coupled to the decision component 302 and provide an interface between the decision component 302 and sensing devices such as IR sensors 134, 136. The decision component 302 may be responsive to output information from sensors 134, 136 to determine a position of the vehicle 102. For example, as described above based on the magnitude of the output signals 138, 140, the decision component 302 can determine the position of the vehicle relative to the gate 142.

In addition, the decision component 302 may issue RFID commands to deactivate or activate readers based on the determined location of the vehicle 102. For example, when the detected position of the vehicle 102 is near the first reader 112, the decision component 302 may issue a command to activate (i.e., turn-on) the first reader 112 in order to collect information from the tags 120 of items 104 being transported on the vehicle 102 and may issue a command to deactivate (i.e., turn-off) the second RFID reader 116 which otherwise could potentially interfere with the first reader's 112 interrogation of the tag 120. As such, frequency interference between the first and second readers 112, 116 can be avoided.

The timeslot scheduling component 310 employs an event-triggered timeslot allocation scheme to determine the precise timing for operating RFID readers 112, 116. In particular, when using multiple dock doors (i.e., dock door 1 and dock door 2), the scheduling component 310 may optimally schedule operations based on certain criteria. For example, the scheduling component 310 may schedule operation of RFID readers based on the applications for which readers are being deployed. Some may be short and frequent reads (dock door) and some may be long reads but not frequent (warehouse).

Figure 3B:
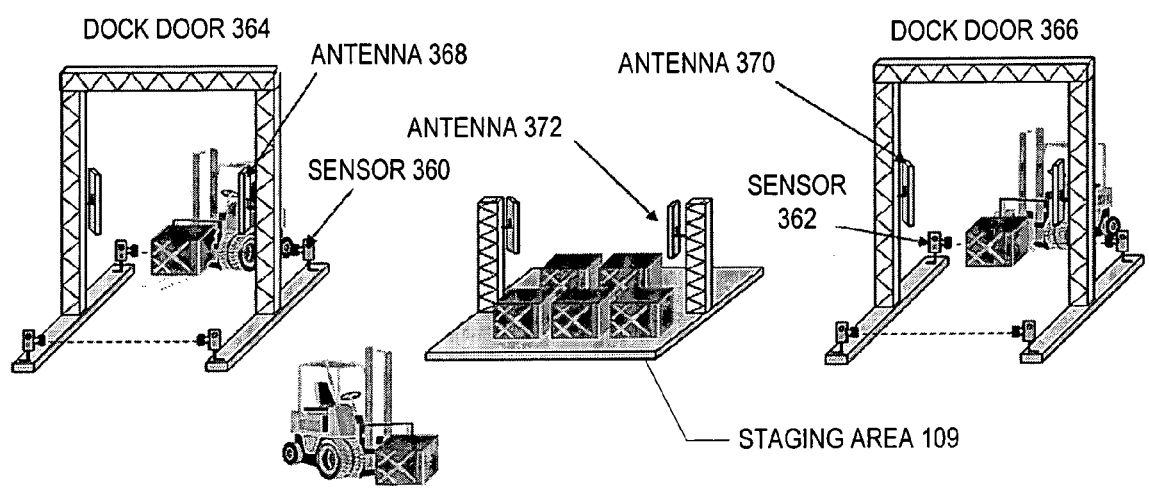
FIG. 3B illustrates a facility having a multiple dock door environment according to one aspect of the inventory management system.
Figure 3C:
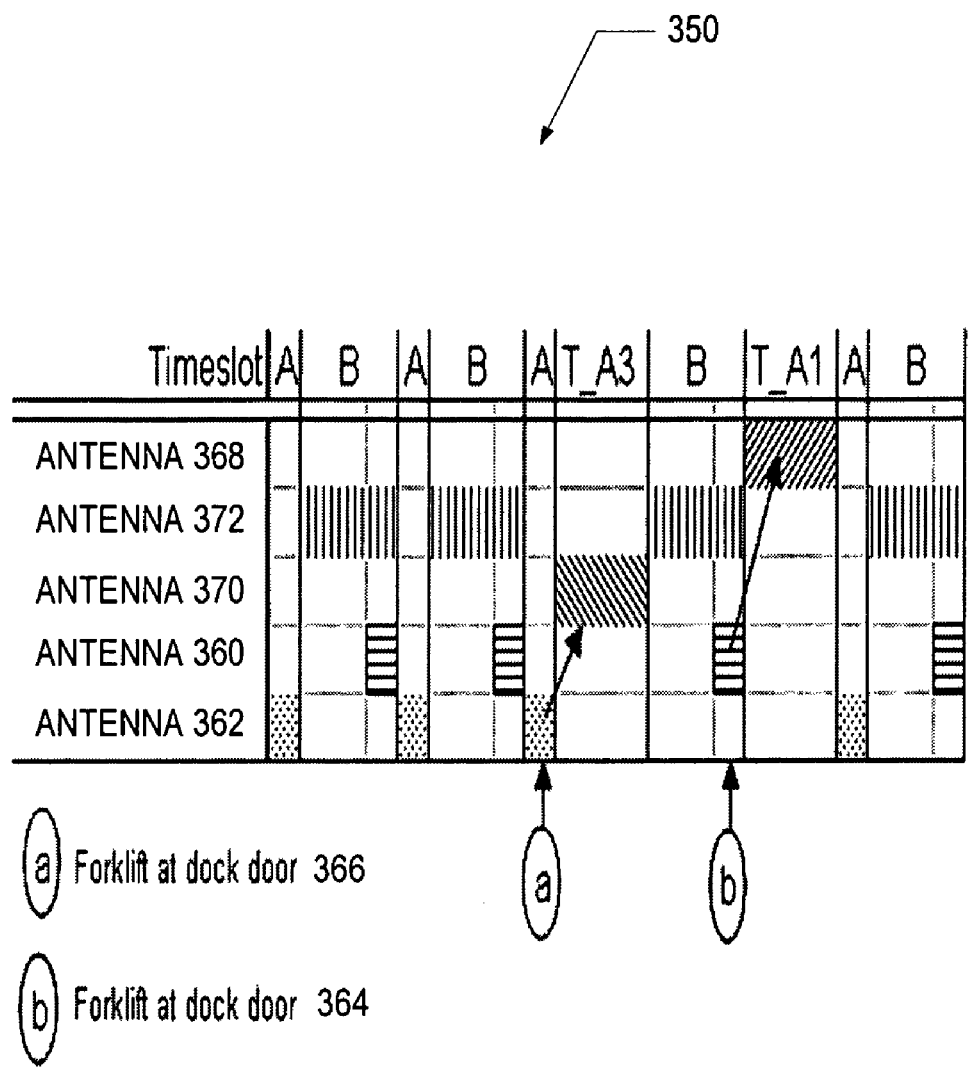
FIG. 3C is a chart of an event-triggered timeslot allocation scheme according to the multiple dock door environment shown in FIG. 3B.

Referring to FIGS. 3B and 3C, an event-triggered timeslot allocation scheme is illustrated in a multiple dock door environment (see FIG. 3B). In most manufacturing environments, where product variety is high and inventory handling is extensive, material flow can be characterized as a "jumbled" flow. Such flow characteristics do not allow for pre-planning and scheduling of such activities (i.e., no cyclic patterns) but rather rely on real-time events occurring in the system. When these systems are equipped with RFID technology and other type of sensors, an effective protocol for medium access is an event-triggered scheduling scheme.

Designing an event-triggered scheduling scheme will require a detailed analysis of possible events that may occur in a particular manufacturing environment. The collection of these events constitutes the overall process/work flow. As shown specifically in FIG. 3B, sensor 360 and sensor 362 may be used at dock doors 364 and 366, respectively, and may be used to detect the presence of material handling equipment and then antenna 368 and antenna 370, respectively, are powered. A staging area antenna 372 may operate on a time-based manner. However, if any of the dock door antennas (i.e., antenna 368 or antenna 370) are "powered on" then the staging area antenna will "power off" or remain "off" to avoid frequency interference. The time allocation graph 350 that facilitates this logic is shown in FIG. 3C. It is assumed that (1) at time=a, there is a forklift at dock door 364, and (2) at time=b, there is another forklift at dock door 366.

Referring back to FIG. 3A, a data logger component 316 may be coupled to the decision component 302 and maintain a log of dock door states and all issued commands. An AGV commander component 318 may be coupled to the decision component 302 and can control operation of the vehicle 102 as well as monitor the position of the vehicle 102. A GUI interface component 320 is coupled to the decision component 302 such that a system administrator can interact with the decision component 302 to define or view system settings, enter inventory data, and/or override the decision component 302 to control operation of the vehicle 102.

Figure 4A:
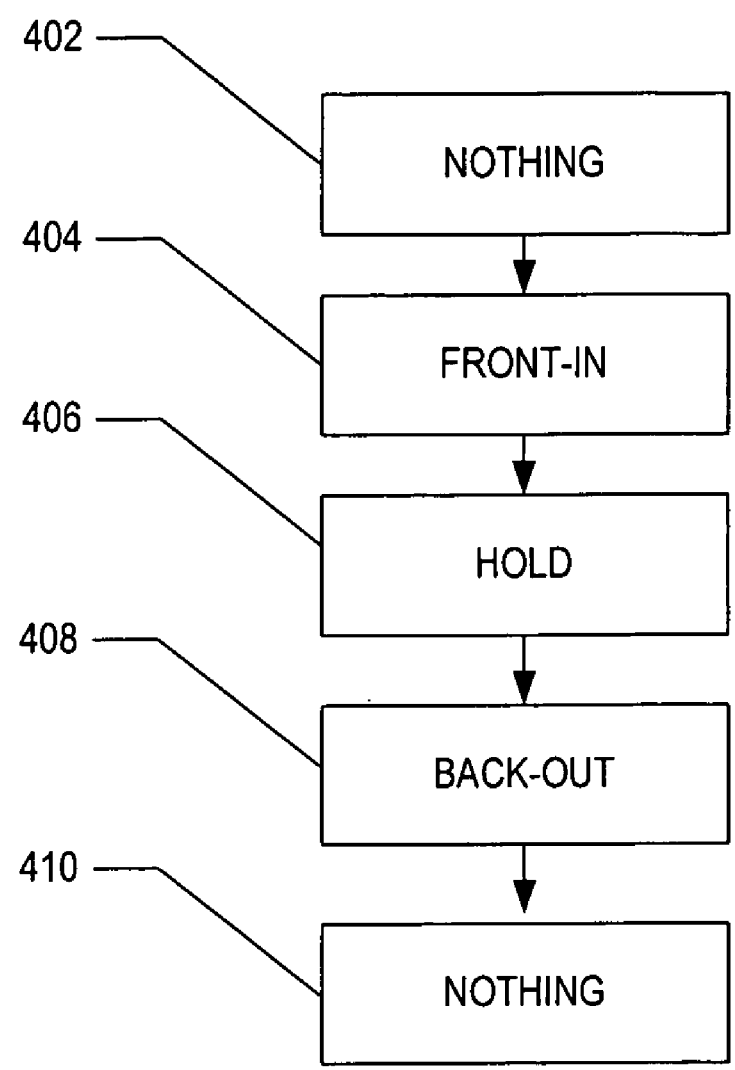
FIG. 4A is a flow chart illustrating various states of a dock door as the vehicle travels from outside of the facility to inside the facility.
Figure 4B:
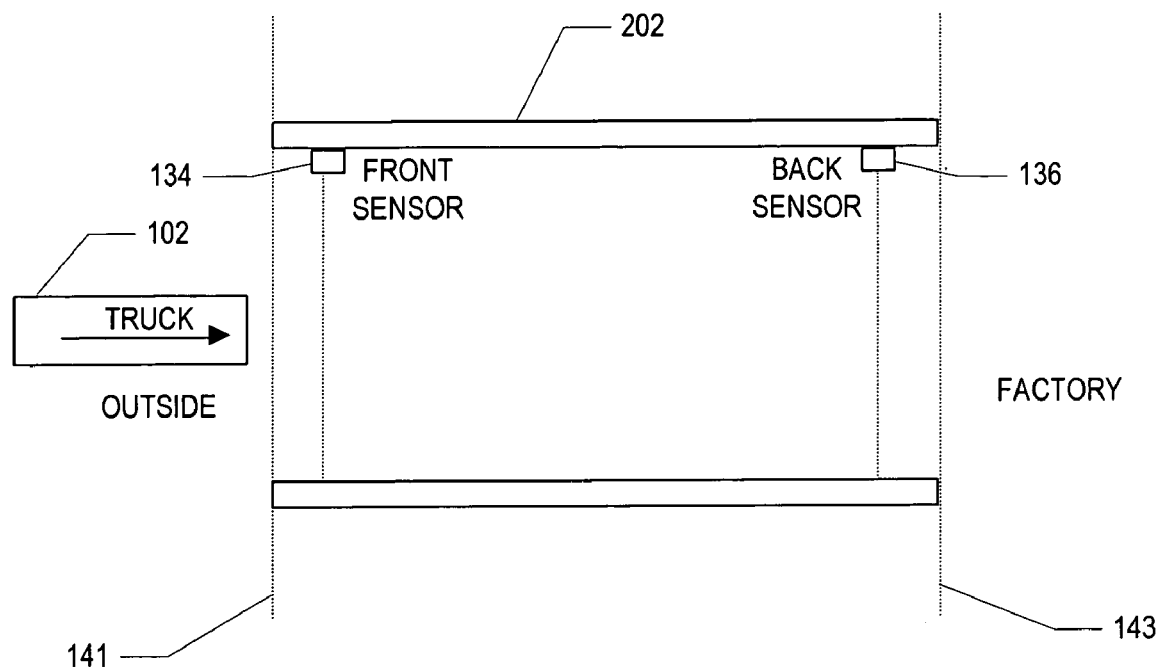
FIGS. 4B-4F are simplified block diagrams illustrating the position of the vehicle relative to the dock door for various states.
Figure 4C:
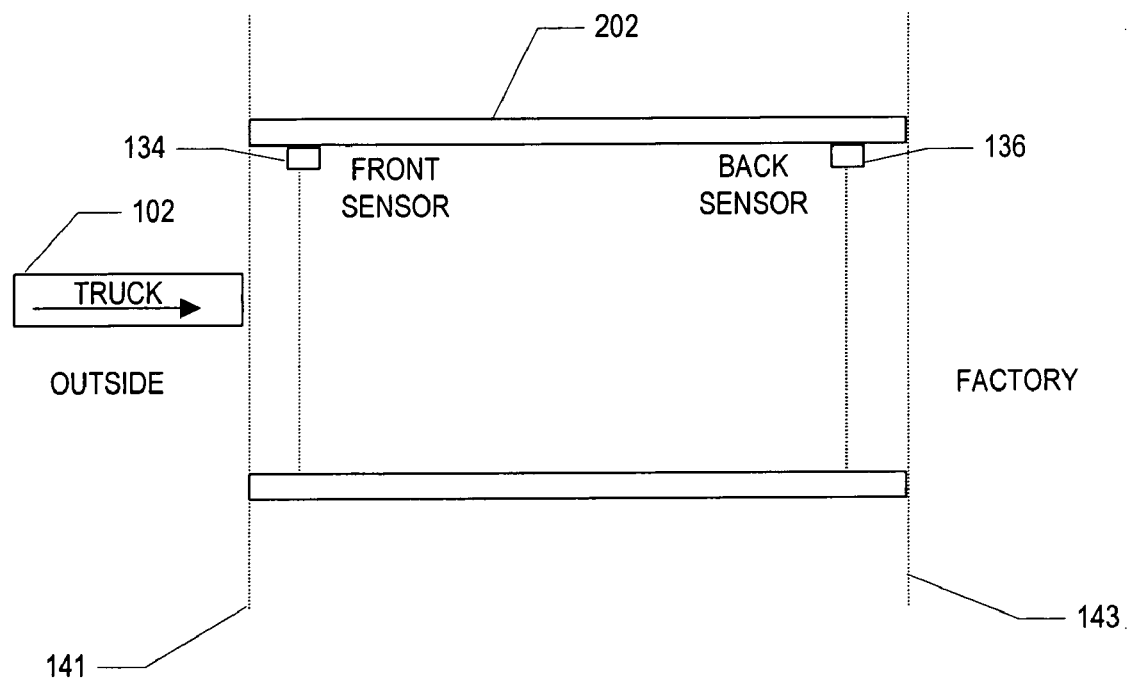
Figure 4D:
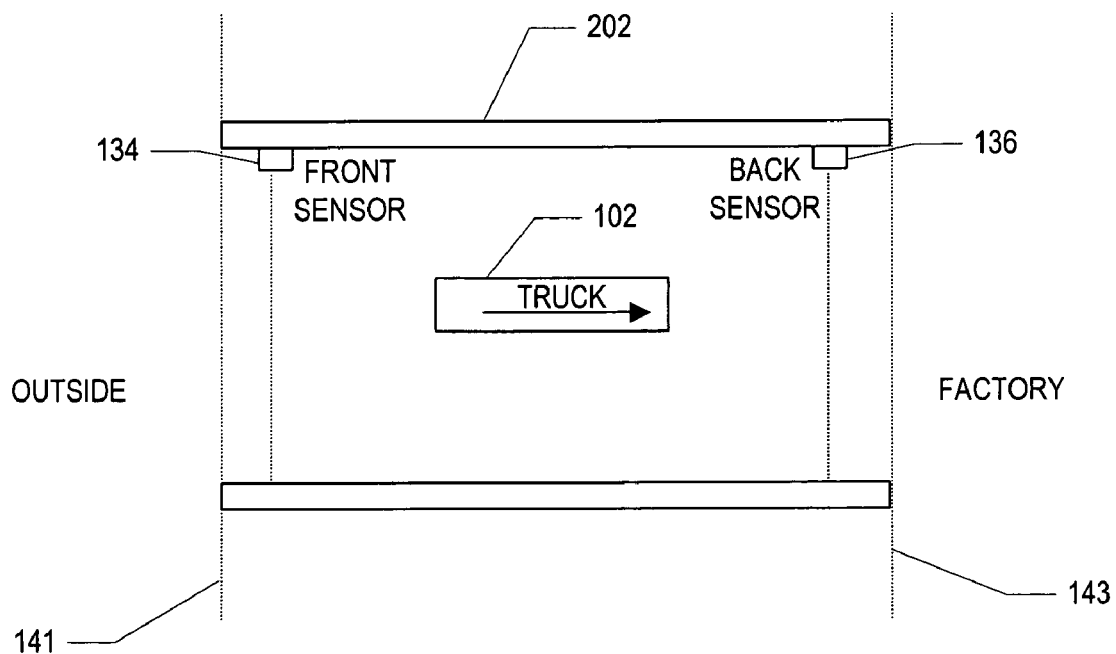
Figure 4E:
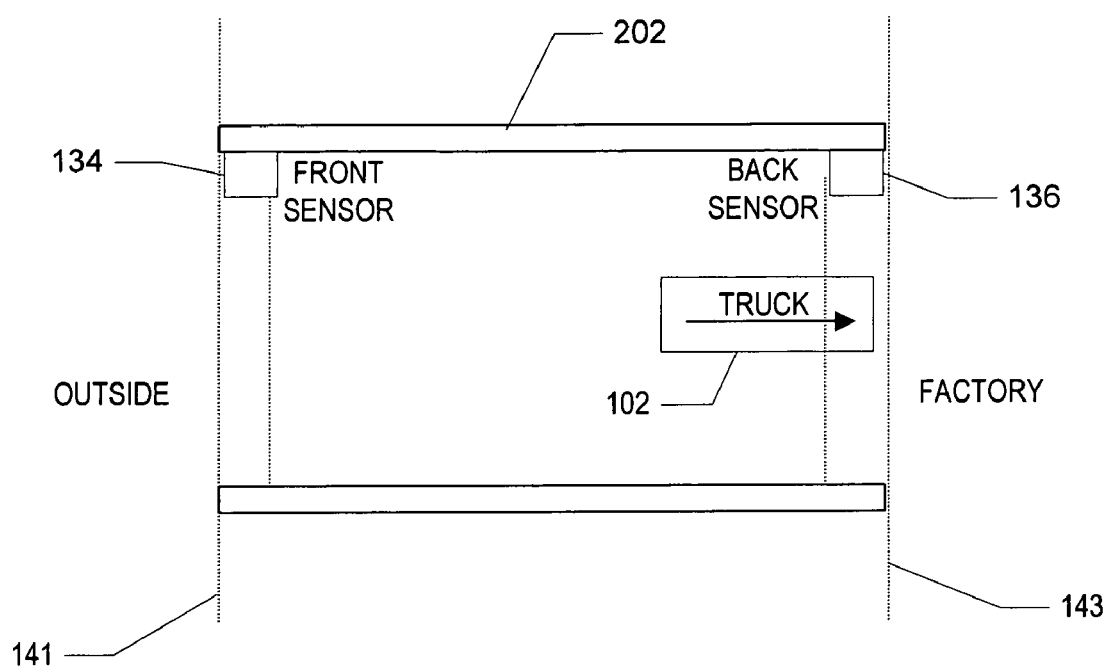
Figure 4F:
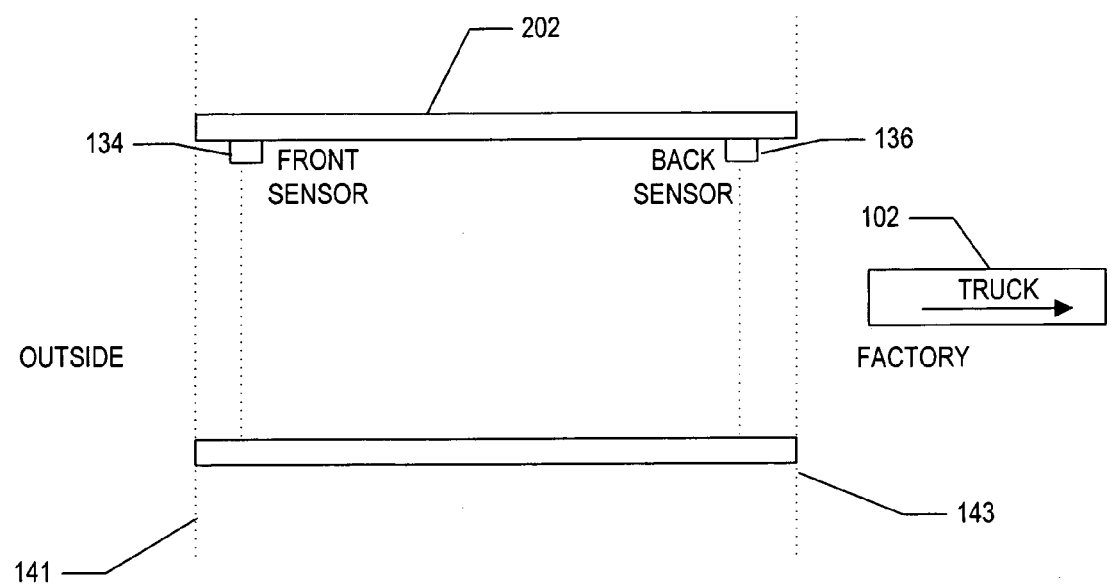

Referring now to FIG. 4A, a flow chart illustrates the various states of the dock door 202 as the vehicle 102 travels from outside of the facility 108 to inside the facility 108. When the vehicle 102 has not yet reached the first sensor 134 (e.g., front sensor in FIG. 4B), the dock door 202 is idle and the middleware server 132 defines the state of the dock door 202 as NOTHING at step 402. As the vehicle 102 enters the dock door 202 (see FIG. 4C), the first sensor 134 detects the vehicle 102 and produces an output signal 138 having a low magnitude (e.g., 0 volts) to indicate the vehicle 102 is present at a first side (e.g., side 141) of the dock door 202. On the other hand, because the second sensor 136 does not detect the vehicle 102 and is not triggered, the second sensor 136 produces an output signal 140 having a high magnitude (e.g., 5 volts) indicating the vehicle 102 is not present at the second side (e.g., side 143) of the dock door. At step 404, the middleware server 132 is responsive to received output signals 138, 140 to define the state of the dock door 202 as "FRONT IN." After a predetermined time period expires (e.g., 3 seconds), the middleware server 132 defines the state of the dock door 202 as "HOLD" at step 406. The HOLD state (see FIG. 4D) is necessary to ensure that the vehicle 102 is located inside the dock door for a sufficient period of time to allow any RFID readers that may be located at the dock door 202 to read tags of items 104 being carried on the vehicle 102. When the vehicle 102 moves to a second side of the dock door 202 (see FIG. 4E), the vehicle 102 triggers the second sensor 136 to produce an output signal 140 having a low magnitude (e.g., 0 volts) that indicates the vehicle is present at the second side of the dock door 202. At step 408, the middleware server 132 is responsive to received output signals 138, 140 to define the state of the dock door 202 as "BACK OUT." After a specified time period (e.g., 3 seconds), the middleware server 132 defines the state of the dock door 202 as "NOTHING" at step 410. (See FIG. 4F).

Figure 5A:
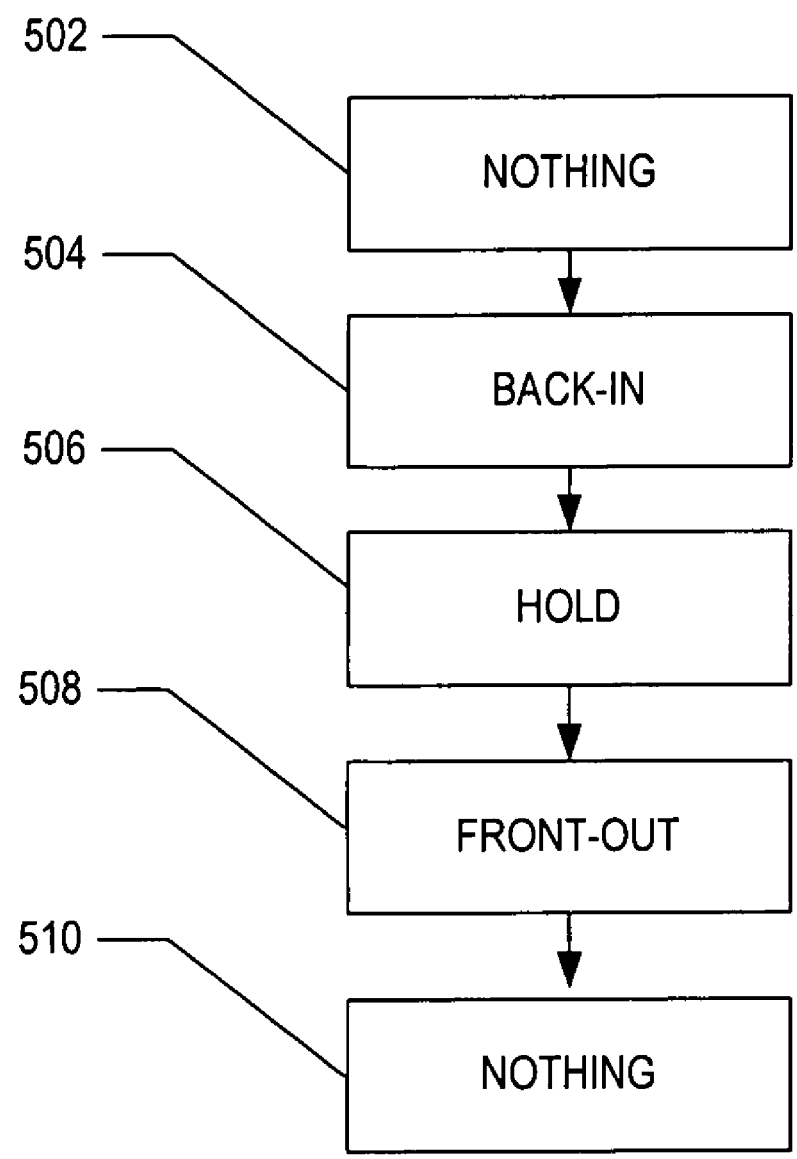
FIG. 5A is a flow chart illustrating various states of a dock door as the vehicle travels from inside of the facility to outside the facility.
Figure 5B:
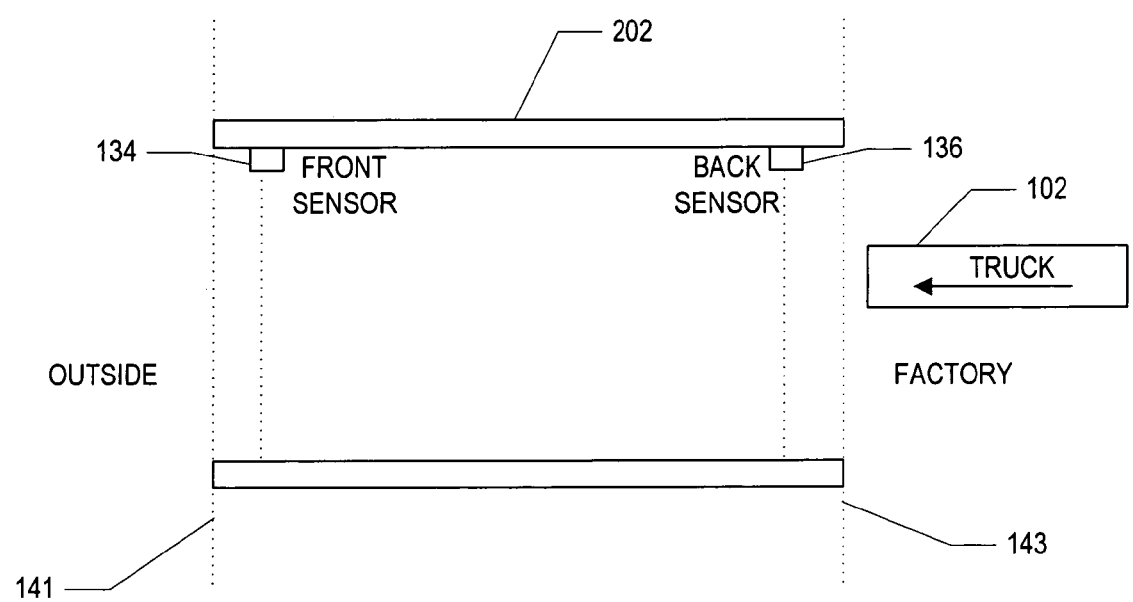
FIGS. 5B-5F are simplified block diagrams illustrating the position of the vehicle relative to the dock door for various states.
Figure 5C:
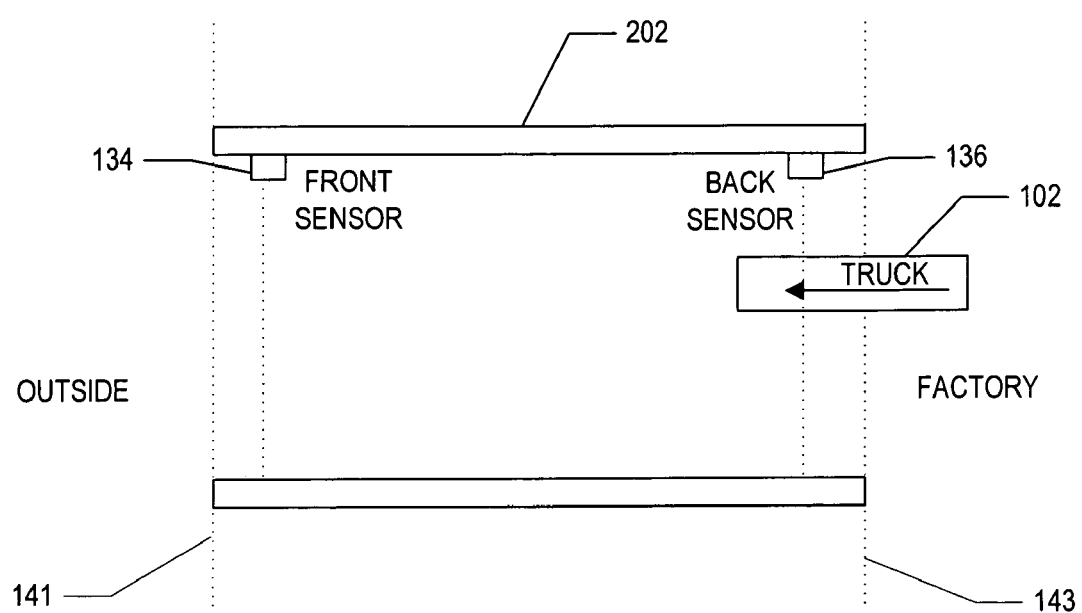
Figure 5D:
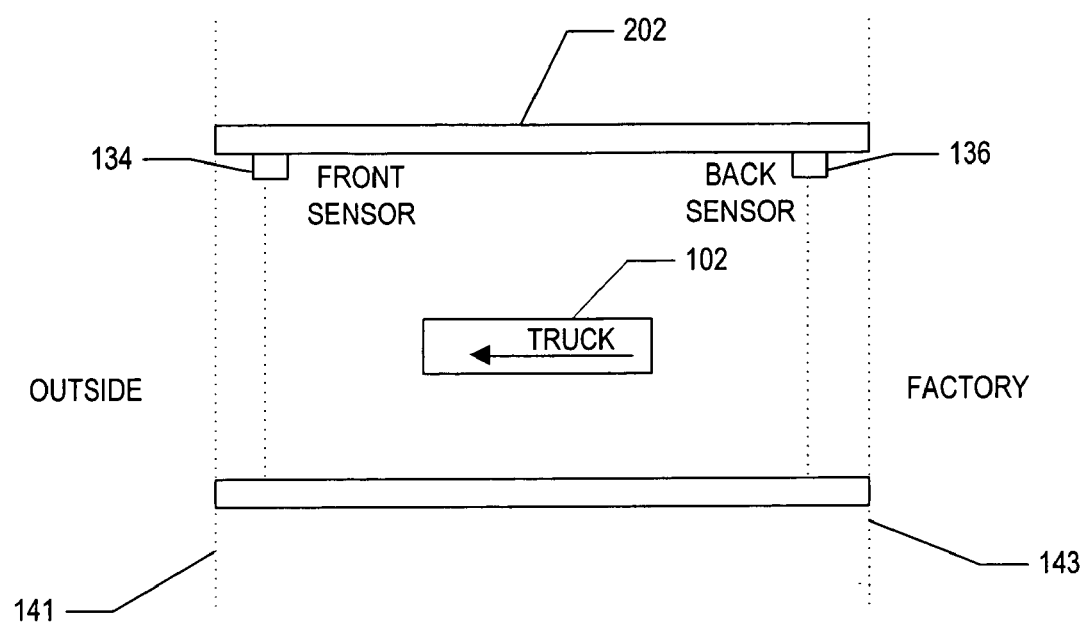

Referring now to FIG. 5A, a flow chart illustrates the various states of the dock door 202 as the vehicle 102 travels from inside the facility 108 to outside of the facility 108. When the vehicle 102 has not yet reached the second sensor 136 (see FIG. 5B), the dock door 202 is idle and middleware server 132 defines the state of the dock door 202 as NOTHING at step 502. When the vehicle 102 begins entry into the dock door 202 (see FIG. 5C), the vehicle 102 triggers the second sensor 136 to produce an output signal 220 having a low magnitude (e.g., 0 volts) that indicates the vehicle 102 is present at the second side of the dock door 202. Since the first sensor 134 is not triggered, the first sensor 134 produces an output signal 218 having a high magnitude (e.g., 5 volts) indicating the vehicle is not present at the first side of the dock door 202. At step 504, the middleware server 132 may be responsive to received output signals 218, 220 to define the state of the dock door 202 as "BACK IN." After a specified time period (e.g., 3 seconds), the middleware server 132 can define the state of the dock door 202 as "HOLD" at step 506. (See FIG. 5D).

Figure 5E:
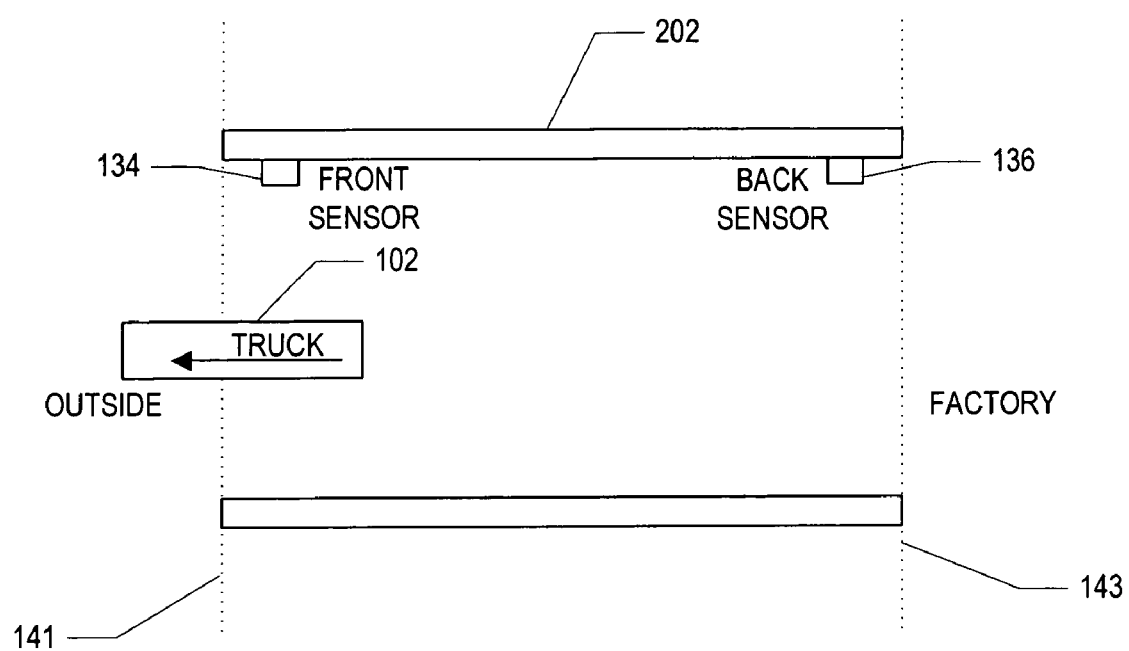
Figure 5F:
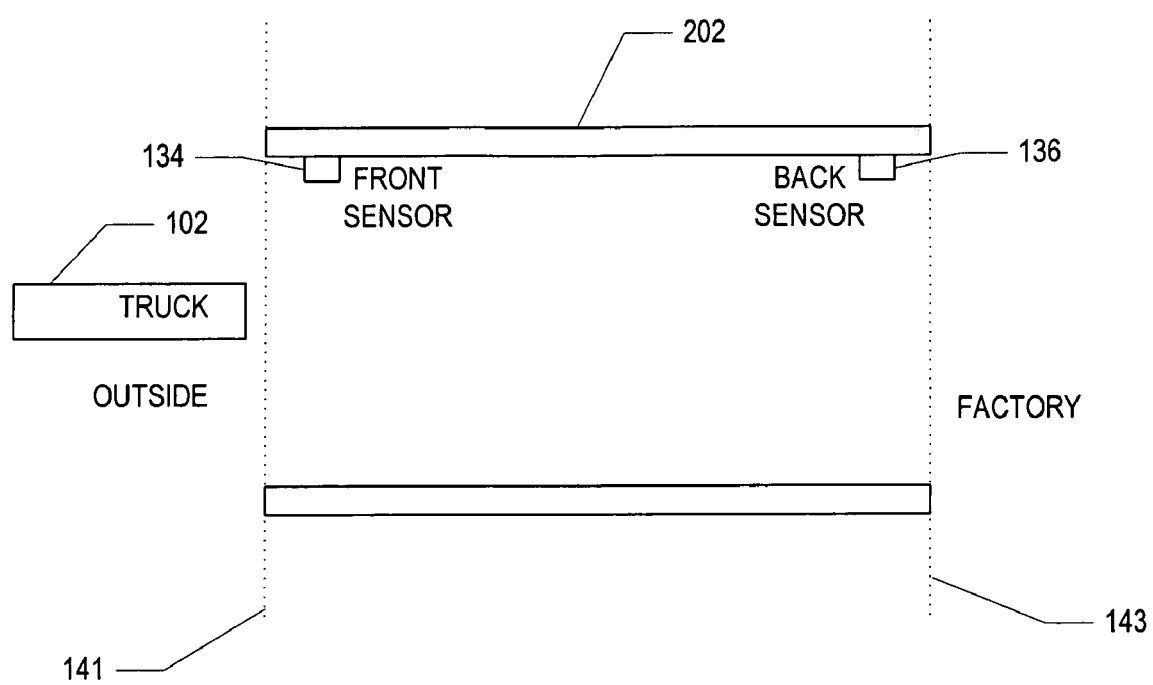

When the vehicle 102 moves to the first side 141 of the dock door 202 (see FIG. 5E), the vehicle 102 triggers the first sensor 134 to produce an output signal 218 having a low magnitude (e.g., 0 volts), that indicates the vehicle is present at the first side 141 of the dock door 202. At step 508, the middleware server 132 is responsive to received output signals 218, 220 to define the state of the dock door 202 as "FRONT OUT." After a specified time period (e.g., 3 seconds), the middleware server 132 defines the state of the dock door 202 as "NOTHING" at step 510. (See FIG. 5F).

Figure 6:
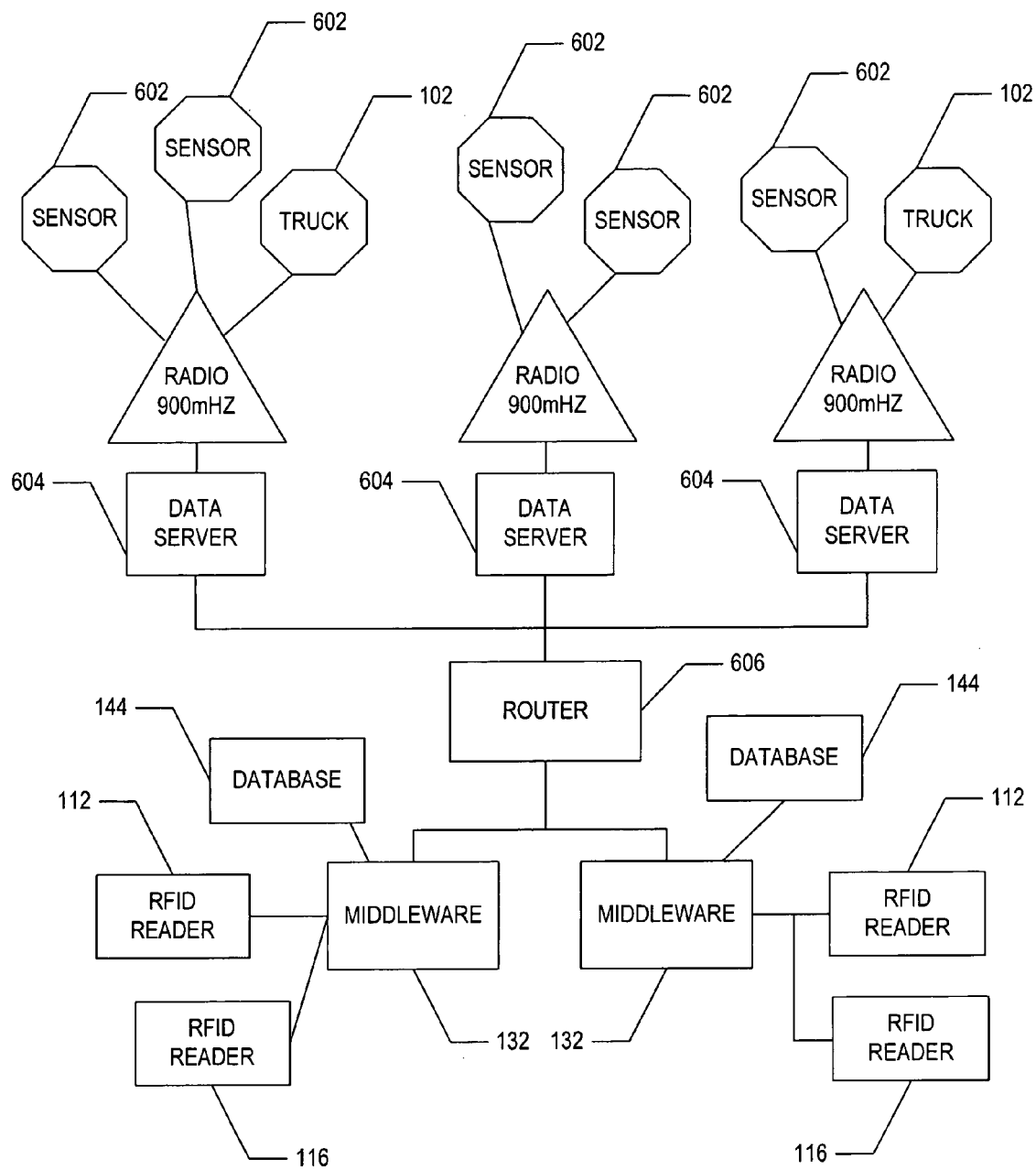
FIG. 6 a simplified block diagram illustrates a sub system for implementing a multi-client and multi-server operation over a communication network.

Referring to FIG. 6, a simplified block diagram illustrates a sub system 600 for implementing a multi-client and multi-server operation over a communication network to allow communication between middleware server 132 and a wireless sensor device 602. Each wireless sensor device 602 or vehicle 102 constitutes a node, and information from all nodes is sent to the middleware 132 through the data servers 604. A router 606 can be operatively coupled to multiple middleware servers 132 and allows communication among the multiple middleware servers 132 via a communication network such as the Internet. In this example, the sensor front-end 308 of the middleware server 132 acts as a client that connects to the data servers for polling sensor information. As such, this architecture eliminates the restrictions imposed by short-range wireless links by expanding the hierarchical networking topology to access remotely located sensors.

Referring to FIG. 7, a method for determining a state of the dock door 202 and managing items of inventory is illustrated. When a vehicle 102 has not entered the dock door 202, the middleware 132 defines the state of the dock door as "NOTHING" at step 702. At decision point 704, the middleware server 132 periodically queries a data log(e.g., data logger 316) to determine the state of the dock door 202. If the first sensor 134 has been triggered since the last query at decision point 704, the middleware 132 determines that the dock door 202 is in a FRONT-IN state and waits to enter the dock door 202 into a HOLD state at step 706. In other words, the middleware server 132 waits for the first sensor 134 to indicate that the vehicle has passed the first sensor 134 (i.e., the first sensor 134 is no longer triggered) to enter the HOLD state. At step 708, the middleware server 132 issues a command to stop the vehicle 102, turn on the first RFID reader 112, reads tags 120 related to items 104 being carried on the vehicle 102, and updates an inventory database 144 based on the information retrieved from the tags 120. The middleware server 132 compares information retrieved from the tags 120 with records in the inventory database 144 to determine if corresponding inventory is scheduled for receipt into inventory 106 at step 710. For example, if a tag 120 of an item identifies the item 104 as a type X widget, the middleware server 132 queries a database 144 to determine if the facility 108 is scheduled to receive type X widgets into inventory 106. At step 712, if a match is found, the middleware server 132 issues a command to the vehicle 102 to proceed to a location or staging area 109, as identified from the inventory database, for the identified items. If a match is not found, it is decided that the truck is unauthorized to deliver the order. An alert is generated and a human is asked to intervene via suitable means (e.g. via instructions on a PDA). After a predetermined time period, the middleware 132 also verifies that the vehicle 102 exits the dock door 202, by verifying that a BACK OUT state and NOTHING state have occurred. If the middleware cannot verify that the vehicle exited the dock door, the middleware may generate an alert message for display to a user at step 714.

Alternatively, if the second sensor 136 has been triggered since the last query at decision point 704, the middleware 132 determines that the dock door 202 is in a BACK-IN state and waits to enter the dock door 202 into a HOLD state at step 716. In other words, the middleware server 132 waits for the second sensor 136 to indicate that the vehicle has passed the second sensor 136 (i.e., the second sensor 136 is no longer triggered) to enter the HOLD state. At step 718, the middleware server 132 issues a command to stop the vehicle 102, turns on the first RFID reader 112, reads tags 120 related to items 104 being carried on the vehicle 102, and updates an inventory database 144 based on the information retrieved from the tags 120. The middleware server 132 compares information retrieved from the tags 120 with records in the inventory database 144 and determines if corresponding inventory is scheduled for shipment out of inventory 106 at step 720. For example, if a tag 120 of an item identifies the item 104 as a type Y widget, the middleware server 132 queries a database 144 to determine if type Y widgets are scheduled for shipment out of inventory 106. At step 722, if a match is found, the middleware server 132 issues a command to the vehicle 102 to proceed to a shipping location, as identified from the inventory database, for the identified items 104. If a match is not found, it is decided that the truck is unauthorized to deliver the order. An alert is generated and a human is asked to intervene via suitable means (e.g. via instructions on a PDA). After a predetermined time period, the middleware 132 also verifies that the vehicle 102 exits the dock door 202, by verifying that a FRONT OUT state and NOTHING state have occurred. If the middleware 132 cannot verify that the vehicle 102 exited the dock door 202, the middleware 132 generates an alert message for display to a user at step 724.

Embodiments of the adaptive inventory management system 100 may be implemented with computer-executable instructions. The computer-executable instructions may be organized into one or more computer-executable components or modules. Aspects of the invention may be implemented with any number and organization of such components or modules. For example, aspects of the adaptive inventory management system 100 are not limited to the specific computer-executable instructions or the specific components or modules illustrated in the figures and described herein. Other embodiments of the RFID system 100 may include different computer-executable instructions or components having more or less functionality than illustrated and described herein.

When introducing elements of aspects of the invention or the embodiments thereof, the articles "a," "an," "the," and "said" are intended to mean that there are one or more of the elements. The terms "comprising," "including," and "having" are intended to be inclusive and mean that there may be additional elements other than the listed elements.

As various changes could be made in the above constructions, products, and methods without departing from the scope of aspects of the invention, it is intended that all matter contained in the above description and shown in the accompanying drawings shall be interpreted as illustrative and not in a limiting sense.

What is claimed is:

1. An adaptive inventory management system, comprising:
   a first sensor located at a first point along a route of travel of a vehicle for determining a position of the vehicle relative to the first point, the vehicle transporting one or more items of inventory;
   a second sensor located at a second point along the route of travel of the vehicle for determining the position of the vehicle relative to the second point;
   a plurality of readers, each of the plurality of readers being positioned at predetermined locations along the route of travel, and wherein each of the one or more items of inventory include at least one tag in operative communication with the one or more of the plurality of readers such that the at least one tag is detected by at least one of the plurality of readers for retrieving inventory data from the at least one tag; and
   a server in operative association with the first and second sensors and in operative association with the plurality of readers for activating and deactivating one or more of the plurality of readers as a function of the determined position of the vehicle relative to the first and second points.

2. The adaptive inventory management system of claim 1, wherein the server is in operative communication with the vehicle such that the server transmits a command signal to the vehicle with the command signal including route instructions that define a particular travel route of the vehicle.

3. The adaptive inventory management system of claim 1, wherein the server is in operative communication with a database for transmitting the inventory data received from the at least one tag, and wherein the server compares the inventory data received from the at least one tag with inventory data contained in the database.

4. The adaptive inventory management system of claim 1, wherein activating and deactivating one or more of the plurality of readers as a function of the determined position of the vehicle prevents frequency interference between at least two of the plurality of readers.

5. A method of adaptive inventory management comprising:
   generating a first position signal at a first sensor located at a first point along a route of travel of a vehicle, wherein the first position signal indicates a position of the vehicle relative to the first point, and wherein the vehicle transports one or more items of inventory;
   generating a second position signal at a second sensor located at a second point along the route of travel of the vehicle, wherein the second position signal indicates a position of the vehicle relative to the second point;
   determining a position of the vehicle along the route of travel at a server as a function of the first and second position signals; and
   controlling, at the server, the operation of each of a plurality of readers positioned at predetermined locations along the route of travel as a function of the determined position of the vehicle.

6. The method of claim 5 wherein each of the one or more items of inventory include at least one tag in operative communication with the one or more of the plurality of readers such that the at least one tag is detected by at least one of the plurality of readers for identifying inventory data from the at least one tag.

7. The method of claim 5 wherein controlling the operation of each of a plurality of readers includes activating and deactivating one or more of the plurality of readers as a function of the determined position of the vehicle relative to the first and second points.

8. The method of claim 5 further including transmitting a command signal that controls the route of travel of the vehicle to the server based on the first and second position signals.

9. The method of claim 5 further including transmitting the first and second position signals to the server for determining the position of the vehicle along the route of travel.

10. An inventory management system comprising:
    a first sensor located at a first point along a route of travel of a vehicle for generating a first position signal, the first position signal indicating a position of the vehicle relative to the first point, and the vehicle transporting one or more items of inventory;
    a second sensor located at a second point along the route of travel of the vehicle for generating a second position signal, the second position signal indicating a position of the vehicle relative to the second point;
    a plurality of readers, each of the plurality of readers being positioned at predetermined locations along the route of travel, and wherein each of the one or more items of inventory include at least one tag in operative communication with the one or more of the plurality of readers such that the at least one tag communicates with at least one of the plurality of readers to identify inventory information from the at least one tag; and
    a processor comprising:
       a decision component to control an operation of the each of the plurality of readers, and
       a sensor front-end component to provide a communication interface between the decision component and the first and second sensors;
       wherein the decision component is responsive to the first position signal and the second position signal to determine a position of the vehicle; and
       wherein the decision component controls the operation of each of the plurality of readers as a function of the determined position of the vehicle.

11. The adaptive inventory management system of claim 10 wherein the processor further comprises:
    a RFID front-end component to provide another communication interface between the decision component and each of the plurality of readers; wherein the decision component is responsive to inventory information identified from the at least one tag to generate a query request; and
    a database front-end component responsive to the generated query request to query an inventory database to retrieve inventory data that corresponds to the inventory information identified from the at least one tag; and
    wherein the decision component is responsive to the inventory information to generate a vehicle command to direct the vehicle to a particular location along the route.

12. The adaptive inventory management system of claim 10 wherein a gate is positioned along the route of travel of the vehicle and in operative communication with the processor and wherein the first point corresponds to an entry side of the gate and the second point corresponds to an opposite side of the gate.

13. The adaptive inventory management system of claim 10, wherein the processor is in operative communication with the vehicle such that the processor transmits a command signal to the vehicle with the command signal including route instructions that define a particular travel route of the vehicle.

14. The adaptive inventory management system of claim 10, wherein the processor is in operative communication with a database for transmitting the inventory data received from the at least one tag, and wherein the processor compares the inventory information received from the at least one tag with inventory data contained in the database.

15. The adaptive inventory management system of claim 10, wherein activating and deactivating one or more of the plurality of readers as a function of the determined position of the vehicle prevents frequency interference between at least two of the plurality of readers.

16. The adaptive inventory management system of claim 10 wherein each of the one or more items of inventory include at least one tag in operative communication with the one or more of the plurality of readers such that the at least one tag is detected by at least one of the plurality of readers for identifying inventory information from the at least one tag.

17. The adaptive inventory management system of claim 10 wherein controlling the operation of each of a plurality of readers includes activating and deactivating one or more of the plurality of readers as a function of the determined position of the vehicle relative to the first and second points.

18. The adaptive inventory management system of claim 10, wherein the decision component generates a command signal that controls the route of the vehicle and wherein the command signal controls the route of travel of the vehicle based on the first and second position signals.

19. The adaptive inventory management system of claim 18, wherein the decision component further transmits the first and second position signals to the processor for determining the position of the vehicle along the route of travel.

20. An adaptive inventory management system, comprising:
- a first sensor located at a first point along a route of travel of a vehicle for determining a position of the vehicle relative to the first point, the vehicle transporting one or more items of inventory;
- a second sensor located at a second point along the route of travel of the vehicle for determining the position of the vehicle relative to the second point;
- a plurality of readers, each of the plurality of readers being positioned at predetermined locations along the route of travel, and wherein each of the one or more items of inventory include at least one tag in operative communication with the one or more of the plurality of readers such that the at least one tag is detected by at least one of the plurality of readers for retrieving inventory data from the at least one tag; and
- a server in operative association with the first and second sensors and in operative association with at least a first reader located at the first point and a second reader located at the second point, wherein the server deactivates the first reader and activates the second reader when the position of the vehicle is determined to be at the second point, and wherein the server deactivates the second reader and activates the first reader when the position of the vehicle is determined to be at the first point.

21. The adaptive inventory management system of claim 20, wherein the server is in operative communication with the vehicle such that the server transmits a command signal to the vehicle with the command signal including route instructions that define a particular travel route of the vehicle.

22. The adaptive inventory management system of claim 20, wherein the server is in operative communication with a database for transmitting the inventory data received from the at least one tag, and wherein the server compares the inventory data received from the at least one tag with inventory data contained in the database.

23. The adaptive inventory management system of claim 20, wherein activating and deactivating the first reader and the second reader as a function of the determined position of the vehicle prevents frequency interference between at least two of the plurality of readers.

* * * * *